United States Patent [19]
Kramer

[11] 3,758,623
[45] Sept. 11, 1973

[54] ISOMERIZATION SOLVENTS
[75] Inventor: George M. Kramer, Berkeley Heights, N.J.
[73] Assignee: Esso Research and Engineering Company, Linden, N.J.
[22] Filed: June 2, 1971
[21] Appl. No.: 149,368

Related U.S. Application Data
[63] Continuation-in-part of Ser. No. 28,039, April 13, 1970, abandoned.

[52] U.S. Cl....... 260/668 A, 260/683.65, 260/683.7
[51] Int. Cl............................................... C07c 5/24
[58] Field of Search.................... 260/668 A, 683.7, 260/683.65

Primary Examiner—Curtis R. Davis
Attorney—Chasan & Sinnock and John Paul Corcoran

[57] ABSTRACT

Benzene, which contains at least four substituted halogens, is an effective solvent for a Lewis acid catalyst employed in the isomerization of hydrocarbons. A particularly preferred isomerization solvent is 1,2,3,4-tetrachlorobenzene and is used in conjunction with aluminum bromide. In another aspect of this invention, if hydrogen, with or without added hydrogenation components, is added to the catalyst system, the isomerization selectivity of the reaction is greatly improved and the life of the catalyst system itself is greatly enhanced. When substantial amounts of benzene are present in the feed, a hydrogenation component is added to the system so that the benzene is hydrogenated to cyclohexane which is then subsequently isomerized to methylcyclopentane.

19 Claims, No Drawings

ISOMERIZATION SOLVENTS

This application is a continuation-in-part of an application and bearing Ser. No. 28,039, which was filed on Apr. 13, 1970, and now abandoned.

The isomerization of aliphatic and aromatic hydrocarbons is well known. Specifically, $C_4$ to $C_7$ paraffins have been isomerized in the past to produce highly branched isomers for use as high octane blending components for motor fuels.

Typically, n-pentane has been known to be isomerized to isopentane, and normal hexane or normal heptane have been known to be isomerized to equilibrium mixtures of the most highly branched components like 2,2-dimethylbutane, 2,3-dimethylbutane and 2,2,3-trimethylbutane. Normal butane is often isomerized to isobutane and the latter is subsequently used in commercial alkylation reactions with olefins to form high octane blending components for motor fuels.

Heretofore, it has been known to make use of various solvents in the isomerization of aliphatic and aromatic materials. In particular, normal and isoparaffins have been employed with Lewis Acid catalysts as disclosed in U.S. Pat. No. 2,987,563.

The use of a solution of aluminum bromide permits a more efficient use of the catalyst than when the aluminum bromide is adsorbed onto a solid support. In solution, aluminum bromide is highly dispersed but on a solid support it is held closely to the surface and only the uppermost or outermost layer of the aluminum bromide can be considered to be effective at any one time. This means that the solid supported catalyst is subject to inhibition or poisoning by subsequent adsorption of a surface coating of a sludge or some form of inhibitor which need only be present in low concentration, i.e., just enough to cover the surface, in order to deactivate the catalyst.

The liquid catalyst system of the subject invention, because of its high degree of dispersion, is inherently more resistant to inhibitors or poisons which is an important advantage of these systems over the supported catalyst systems. Another advantage of the liquid systems is that they provide more reproducible and controllable catalysts than do those systems using a catalyst support.

The supports generally are not well defined systems that contain at the surface impurities, which if present in the bulk in the long run affect catalyst performance and activity.

In the past, the hydrocarbons themselves have been used as solvents; however, these suffer the disadvantage of not being able to remain as a homogeneous liquid or to sustain a long lived catalyst while the isomerization proceeds. When the hydrocarbon itself is used as the solvent, one is able to observe the rapid formation of a second layer or "sludge" phase. For example, while isomerizing hexanes with $AlBr_3$ the sludge phase develops rapidly. This layer is believed to be highly ionic in character and tends to absorb the $AlBr_3$ from the hexane layer onto itself and the sludge layer is often considered to be a moderately active catalyst; however, it is subject to inhibition by adsorption of a surface coating of relatively inert compounds such as with a solid support and may be deactivated by other unknown paths.

Other solvents such as chlorobenzene and nitrobenzene or nitroalkanes have also been used to prepare homogeneous solutions of aluminum halides and paraffins for isomerization purposes. However, these solvents have generally been found to interact too strongly with the aluminum halide to allow it to be of much use as a paraffin isomerization catalyst. These systems are useful for accomplishing reactions that only require moderately strong acids (i.e., the alkylation of aromatics with olefins), but the solvents are generally too basic to permit the isomerization of paraffins.

U.S. Pat. No. 2,987,563 discloses as solvents the 1,2,3-trichlorobenzene or the 1,2,4-trichlorobenzene systems that have been of most value as media for paraffin isomerization. Although this solvent represents a significant improvement over the art, it was limited somewhat in its rate of activity.

It has been found that the difficulties experienced with paraffins and the other solvents just described can be substantially overcome by using the process at the instant invention. For example, by using 1,2,3,4-tetrachlorobenzene as a solvent for aluminum bromide, a solution is obtained which mixes readily with hexane and which can easily be promoted so as to cause a more rapid, selective and efficient isomerization than previously possible. When solutions are promoted with HBr and/or $H_2O$, one can either conduct a purely homogeneous isomerization or obtain a partially miscible two-phase liquid system, (hexane in one phase and $AlBr_3$-1,2,3,4-tetrachlorobenzene in the other). The homogeneous system is obtained at lower HBr pressures and corresponds to less activity than the mixed phase system.

The two-phase system is formed at higher HBr pressures and is markedly different than the two-phase systems previously found with hydrocarbon solvents in that rapid and selective isomerization occurs and a long lived catalyst is produced when tetrachlorobenzene is used.

It has been known that adding hydrogen to various Lewis acids improves the isomerization processes being conducted therein. Hydrogen is used to suppress side reactions and prevent the in situ formation of inhibitions as well as to remove contaminants that may be in the feed.

For example, an article relating to the isomerization of pentanes and hexanes and authored by B. L. Evering, E. D. D'Ouville, A. T. Lien and R. C. Wall was published in the *Industrial and Engineering Chemistry*, Vol. 45 in March of 1953 and discloses that in the use of aluminum chloride the introduction of hydrogen is effective for pentane isomerization. When isomerizing pentane, this article states that hydrogen pressures must be between 130 and 200 pounds per square inch and the temperature must be as high as 150°C. At temperatures as high as 150°C. a partial hydrogen pressure of 900 pounds per square inch is necessary in order to prevent the occurrence of side chain reactions. Furthermore, in the isomerization of hexane using the aluminum chloride system, it is seen that at 100°C. a hydrogen pressure of 1,000 pounds per square inch is required to be effective in inhibiting side reactions, whereas if the hydrogen pressure was lowered to 500 pounds per square inch and the reaction temperature was increased to 150°C. there was a gross amount of butane and lighter ends formed in the isomerization reaction.

It has also been found that if hydrogen is added during the isomerization of the hydrocarbons using the catalyst system of the subject invention, that the selectivity and life of the catalyst system is greatly improved. This permits a highly selective isomerization of hexane to 2,2-dimethylbutane. For example, the presence of hydrogen in the catalyst system of the subject invention permits a highly selective isomerization of hexane to 2,2-dimethylbutane (i.e., towards equilibrium $C_6$ distribution) in a continuous manner.

In the subject catalyst system it has been discovered that the hydrogen pressure can be as low as 10 pounds per square gauge inch and does not have to exceed over 200 pounds per square inch in order to eliminate the side reactions.

Briefly, this invention comprises a process for isomerizing hydrocarbons which comprises a step of contacting said hydrocarbons under isomerization conditions in the liquid phase with a Lewis acid catalyst, said Lewis acid catalyst being dissolved in a tetra-halo-substituted benzene.

In another embodiment, this invention comprises a step of adding hydrogen at pressures ranging from 10 to 200 psig.

In yet another embodiment this invention comprises carrying out the reaction in the presence of a hydrogenation catalyst. The hydrocarbons is isomerized by the process of the subject invention can be normal paraffins having a chain length of $C_4$ or higher, preferred normal paraffins to be isomerized are those having a chain length ranging from $C_4$ to $C_7$. Typical isomerization reactions which would take place according to the process of the instant invention include the conversion of normal pentane to isopentane, normal butane to isobutane, n-hexane to isohexane, n-heptane and $C_7$ naphthas to highly branched isomers such as 2,2,3-trimethylbutane, 2,2-dimethylpentane, 3,3-dimethylpentane, 2,3-dimethylpentane and 2,4-dimethylpentane.

The instant process may also be utilized to isomerize methylcylopentane to cyclohexane which is valuable as a chemical intermediate and to the general isomerization of alkyl cycloalkanes to the equilibrium distribution of isomers.

Aromatic compounds containing methyl and ethyl side chains undergo isomerization by the subject catalyst system. For example, any of the xylenes may be isomerized to an equilibrium mixture of its three isomers and this is useful because of the difference in value of the isomers as intermediates for further chemical processing. Aromatic compounds also undergo disproportionation reactions with the catalyst system. For example, isopropyl benzene readily yields benzene and diisopropylbenzene while toluene slowly reacts to form benzene and xylenes.

Typical feedstreams would include normal paraffins found within a naphtha boiling between 10°F. and 210°F. Additionally, the butane stream obtained at the tail end of the butane-olefin alkylation process as well as the paraffins remaining after extracting light olefins from cat cracked streams and the light components coming from the powerforming reaction are good sources of feed. With relation to the aromatics which may be isomerized by the instant process, xylenes, trimethylbenzenes, and tetramethylbenzenes are suitable feeds that can be obtained from virgin naphthas, catalytic reformers or catalytic crackers.

The catalyst for this isomerization reaction is a Lewis acid. As defined in this invention, a Lewis acid is any molecule, radical or ion in which the normal electron grouping about a given atom is incomplete so that the atom may accept an electron pair or pairs. The preferred Lewis acid used in the instant invention is aluminum bromide. However, the following Lewis acids may be used effectively: $AlBr_2Cl$, $AlBrCl_2$, and $BBr_3$. Other Lewis Acids such as $TaF_5$, $NbF_5$, $SbF_5$, $AsF_5$, $BCl_3$, $BF_3$ and $AlCl_3$ may be used with tetrachlorobenzene at concentrations up to their solubility limit. Any such Lewis acid is operable in the subject invention provided there is no specific deleterious reaction between the Lewis acid and the solvent employed in said reaction.

The solvent is a tetrahalosubstituted benzene. Specifically, 1,2,3,4-tetrachlorobenzene, 1,2,3,4-tetrabromobenzene, 1,2,3,4-tetrafluorobenzene and 1,2,3,4-tetraiodobenzene may be effectively used as a solvent for the subject reaction. Preferably, the tetrachloro, bromo and fluoro substituted benzenes are utilized. Other solvents which produce an extremely rapid reaction rate while minimizing side reactions are as follows: pentachlorobenzene, pentafluorobenzene and pentabromobenzene.

Ths isomerization of the instant invention will take place at a temperature between ambient and 254°C. Preferably, the temperature of the isomerization ranges from ambient to 125°C.

The tetrachlorobenzene to be utilized in the instant invention is a solid which melts at 47.5°C. It forms partially miscible liquid systems with paraffins and $AlBr_3$ at room temperature and may be used between 25°C. and its boiling point of 254°C. as a solvent for these reactions, but temperatures between 50°C. and 100°C. are preferred. In general, it is desirable to isomerize at as low a temperature as possible because the equilibrium isomer distribution then contains the highest concentration of the most branched isomers. Isomerization rate increases with such solvents are approximately 10 to 20 times the isomerization rate when utilizing 1,2,4-trichlorobenzene.

The catalyst solution should be present in a volume ratio of 10/1 to 0.1/1 relative to the volume of feed, preferably 2:1 to 0.5:1 and most preferably 1:1 to 0.5:1. In preferred embodiments of the instant invention, the homogeneous catalyst will convert the folowing:

n-pentane and n-hexane to the equilibrium mixture of isomers any xylene to an equilibrium mixture of isomers cyclohexane to equilibrium with methylcyclopentane.

A catalyst of aluminum bromide and 1,2,3,4-tetrachlorobenzene is prepared by dry mixing the solid components at room temperature. The mixture melts readily near 40°C. when mixed with hexane.

Pressures may vary widely but a range of one atmosphere to 100 atmospheres are acceptable. The preferred range for pressure would be between one atmosphere and 15 atmospheres.

The Lewis acids should be present in the solvent at a relatively high concentration which ranges from 0.1 to more than 3.0 molal solutions in the solvent, preferably 2.0 to 3.7 molal solutions with $AlBr_3$.

The acid solution is mixed with a hydrocarbon feedstream in a ratio of 0.1 to 4 volumes of hydrocarbon per 1 volume of acid, preferably in the ratio of 1:1 to 2:1. In addition to the Lewis acid, there may be a minor amount of a promoter such as methyl t-amyl ether, $H_2O$ or HBr added to the catalyst component. The promoter serves the function of easing the formation of carbonium ions which are the reaction intermediates. The promoter if utilized, is present at a concentration of 0.001 to 0.1 moles/liter based on the Lewis acid-solvent mixture.

In addition, it has been discovered that a highly selective isomerization can be effected if hydrogen under pressures ranging from 10 psig to 200 psig is employed. A selective isomerization is defined for the purposes of this invention as one in which the ratio of cracked products formed to 2,2-dimethylbutane in the case of the isomerization of hexane is less than 0.1:1. It has also been noted that the hydrogen increases the life expectancy of the catalyst and protects it from deactivation. The reason for deactivation is believed to be because of the slow formation of unsaturated cyclic compounds which act as bases towards the acid system and thus neutralize the catalyst.

The contacting between the catalyst and the hydrocarbon feed stream may take place in a batch or continuous operation. It is preferred to use a continuous operation in which flow rates of about 0.1 to about 10 V/V/Hr. are utilized, preferably 0.1 to 3 and most preferably 0.5 to 2.0 V/V/Hr.

For a batch operation, the following apparatus would be utilized; a reactor made from steel or monel, preferably containing inert walls; such as glass, porcelain or Teflon, although these are not required. The apparatus should also be fitted with provisions for stirring, adding and withdrawing the reactants utilized in isomerization as well as the products. The products are separated from the catalyst by standard means such as distillation. In a continuous operation, the apparatus would contain sections for the continuous introduction of feed streams to the reactor and for the continuous withdrawal of the catalyst-solvent hydrocarbon system to a standard separator. Product would be collected at the separator and the catalyst and solvent would be recycled to the reactor. Provision would be required for the continuous introduction of small amounts of the catalyst and promoter to replace that which is consumed during the operation.

Although not intending to be bound by any specific theory as to operation, the favorable results achieved with the instant invention, i.e., minimization of side reactions and maximum rate for the isomerization are believed to stem from the fact that the solvents, disclosed herein generally contain aromatic rings of very low basicity because of the electron withdrawing properties of the halide substituents as has been indicated above. This property in itself is not sufficient to control side reactions but it is a contributing factor. Thus, side reactions are controlled in this system by adding conventional cracking inhibitors such as methylcyclopentane or other well-known naphthenes and hydrogen. These in combination with with the weakly basic solvents allow a very selective isomerization.

In a preferred embodiment of the instant invention, a feed stream which would be a $C_6$ paraffin stream is isomerized over an aluminum bromide catalyst which was contained in 1,2,3,4-tetrachlorobenzene. The hydrocarbon to be isomerized is present in an amount of one volume while the catalyst solution is present in an amount of 0.5 to 2 volumes and includes a promoter which is HBr at a partial pressure of 1 to 5 atmospheres. The catalyst solution has a 2.0 to 3.7 molal concentration of aluminum bromide. The isomerization reaction takes place at a temperature of 65° to 100°C., a pressure of 1 atmosphere to 6 atmospheres and on a continuous basis at a flow rate of 0.2 to 2.0 Vol.feed/Vol.Cat.Hr. . The resulting product contains more than 90 percent of an essentially equilibrium mixture of hexanes and less than 10 percent undesired side products which are mainly butanes and pentanes.

In isomerizing the various hydrocarbons over the aluminum bromide catalyst when set forth in the particular solvent that we have found to increase the overall activity of the catalyst, the addition of hydrogen will prevent side reactions. In addition, when unsaturated compounds are present which tend to reduce the efficiency of the catalyst system, it is within the scope of this invention that we add a hydrogenation component so that a hydrogenation reaction can occur. The hydrogen pressures are maintained in a range ranging from about 10 pounds to 200 pounds per square inch gauge and the hydrogenation component is a Group VIII metal such as platinum, palladium, ruthenium, rhodium, rhenium, supported on carbon, alumina, silica, or inert polymers like Teflon.

Commercially available catalysts obtained from Engelhard have been generally found to be acceptable hydrogenation components. Catalysts containing about 5 percent metal on carbon have been most useful, particularly those available in Engelhard's catalyst testing kits. About 5 percent of the platinum on carbon catalyst when added to the $AlBr_3$-tetrachlorobenzene system provides a strong enough hydrogenation component to convert 6 percent benzene in a $C_6$ feed to cyclohexane in 4–6 hours with a hydrogen pressure of 70–80 psig. Platinum and palladium are the most active Group VIII metals but a number of alloys like Pt-Rh also particularly effective. The alloy containing 30% Pt – 70% RhO on C is available from Engelhard but other alloys of Pt and other Group VIII metals may be used.

Suitable supports for the hydrogenation catalysts include silica, glass beads, glass chips and glass fibers. Inert polymers such as those belonging to perfluorinated series like Teflon and Kel-F are also useful for supporting this hydrogenation catalyst. These supports are made commercially and no further description of them is believed necessary.

EXAMPLE 1

The following runs are used to illustrate the process of the instant invention.

TABLE I

|  | Run 1 | Run 2 | Run 3 |
|---|---|---|---|
|  | 1,2,3,4 tetra-chlorobenzene, 1 ml |  | 1,2,4 trichloro-benzene, 1 ml |
| $AlBr_3$, m | 0.5 | 0.5 | 0.5 |
| Promoter, m $CH_3$-O-t-$C_5H_{11}$ | 0 | 0.02 | 0.02 |
| Temp., °C. | 65 | 65 | 65 |
| Feed, 0.5 ml | n-Hexane | n-Hexane | n-Hexane |
| Time, Min. | 15 | 15 | 15 |
| Isomerization, % | 1.2 | 17.6 | 2.2 |
| Isomerization/ Cracking 17/1 |  | 0.25/1 | 2.1/1 |
| $C_6$ Conv., % | < 2% | ~ 54* | 3* |

* Uncorrected G.C. analysis

From the above it is seen that 1,2,3,4-tetrachlorobenzene yields a far more active catalyst than 1,2,4-trichloro-benzene. Thus, the overall conversion in comparative runs 2 and 3 shows about an 18 fold increase in overall activity of the 1,2,3,4-tetrachlorobenzene system vs 1,2,4-trichlorobenzene under otherwise identical conditions.

EXAMPLE 2

The active catalyst in Table I did not yield a very selective product, i.e., the ratio of isomerization to cracking was only 0.25/1. However, as mentioned above, the selectivity can be markedly improved by adding a naphthene inhibitor to the feed. In Table II another comparison is made which illustrates the ability of methylcyclopentane to control cracking in this system.

TABLE II

| 2M AlBR$_3$$^a$-1,2,3,4 C$_6$H$_2$Cl$_4$, gm | 0.50 | 0.50 | 0.50 | 0.50 |
|---|---|---|---|---|
| n-hexane, ml. | 0.25 | 0.25 | 0.25 | 0.25 |
| HBr, atm. | 1 | 1 | 1 | 1 |
| Methylcyclopentane, Vol. % in C$_6$ | 0 | 6 | 24 | 30 |
| Time, hr. | 3 | 3 | 3 | 3 |
| Temp. °C. | 65 | 65 | 65 | 65 |
| C$_6$ Isom., % | 36 | 80 | 71 | 64 |
| Isomerization/cracking | 0.8/1 | 33/1 | >50/1 | >50/1 |

$^a$This is a 2 molal mixture of AlBr$_3$ in 1,2,3,4-C$_6$H$_2$Cl$_4$

This data indicate that by adding methylcyclopentane the selectivity can be markedly improved. Thus, whereas there is less isomerization then cracking in the uninhibited run, the ratio of isomerization to cracking can be shifted to more than 50/1 by adding the naphthene. One may note that the overall conversion of hexane to isomer plus cracked products is about the same in all experiments, i.e., the activity is roughly comparable, but the product distribution is much improved.

EXAMPLE 3

In Table III, it is shown that adding a naphthene to an isomerization reaction carried out in the presence of an aromatic inhibitor results in much improved isomerization, particularly with respect to selectivity.

TABLE III

| 2M AlBr$_3$-1,2,3,4-C$_6$H$_2$Cl$_4$, gm | 0.5 | 0.5 |
|---|---|---|
| n-hexane, ml | 0.25 | 0.25 |
| HBr, atm. | 0.5 | 0.5 |
| Benzene, Vol. % in C$_6$ | 0.1 | 0.1 |
| Methylcyclopenatne, Vol. % in C$_6$ | 0 | 6 |
| Time, hr. | 3 | 3 |
| Temp. °C. | 95 | 95 |
| C$_6$ Isom., % | 40 | 87 |
| Isomerization/cracking | 0.7/1 | >50/1 |

Thus, adding 6% methylcyclopentane to a feed containing 0.1% benzene at 85°C. leads again to a change in the isomerization/cracking ratio from 0.7/1 to >50/1.

EXAMPLE 4

In Table IV it is shown that the addition of 5 percent of a hydrogenation component, (5% Pt/c) and 80 psig H$_2$ to the AlBr$_3$-1,2,3,4-tetrachlorobenzene system permits the isomerization of n-hexane containing 7 percent benzene.

TABLE IV

Hydrogenation of Benzene and Hexane Isomerization with Dual Function Catalyst

Conditions: 95%-3M AlBr$_3$-OCl$_4$; 5%-5% Pt/C; 20 gm Hexane Feed, 20 ml 65°C., 80 psig H$_2$

| Product, Mol. Pct. | Feed | 4 hr. | 6 hr. |
|---|---|---|---|
| C$_3$ | | | .03 |
| iC$_4$ | | Tr | .7 |
| nC$_4$ | | | .03 |
| iC$_5$ | | Tr | .5 |
| nC$_5$ | | | .03 |
| 22 DMC$_4$ | | 19.6 | 44.5 |
| 23 DMC$_4$ + 2MC$_5$ | Tr | 44.0 | 31.8 |
| 3 MC$_5$ | Tr | 16.1 | 10.0 |
| nC$_6$ | 93.3, 92.6 | 14.7 | 5.4 |
| MCP | Tr | 1.5 | 0.5 |
| C$_7$C$_8$ | | 4.1 | 6.4 |
| C$_6$H$_6$ | 6.7, 7.4 | 0.0 | 0.0 |

In this experiment, benzene was hydrogenated and converted to a mixture of cyclohexane and methylcyclopentane. The hexane isomerization was promoted by trace components in the system, mainly 7 percent water on the carbon. Negligible isomerization occurred in a blank experiment with Engelhard's carbon base but no platinum. Table IV therefore shows a rapid and selective isomerization of n-hexane containing benzene over the dual function catalyst.

The beneficial effect of hydrogen in the absence of any special hydrogenating component is demonstrated in this example. Two continuous isomerization runs are shown, each with the same C$_6$ feed, feed rate, catalyst and temperature.

| Run | Psig | Partial Pressure Psig HBr | Partial Pressure Psig H$_2$ | Life hr. |
|---|---|---|---|---|
| A | 30 | 30 | 0 | 5–10 |
| B | 60 | 6–12 | 48–54 | >200 |

In Run A only HBr was added to the feed. It served the dual function of providing the catalyst initiator and being the "stripping" gas required to keep a constant amount of hydrocarbon in the reactor. At 30 psig HBr, rapid isomerization was induced but the catalyst life was shortlived as shown by a rapid conversion to >40 percent 2-2-dimethylbutane and a subsequent rapid decline in activity. The useful life of the catalyst was about 5 to 10 hours.

In Run B, HBr and H$_2$ are used together. The HBr partial pressure was varied through the run but generally, was 6–12 psi while the H$_2$ partial pressure was about 50 psi. The useful life was extended to over 200 hours for this system showing more than an order of magnitude improvement in catalyst life when H$_2$ is used with HBr.

What is claimed is:

1. A process for isomerizing hydrocarbons which comprises contacting said hydrocarbons under isomerization conditions in the liquid phase with a Lewis acid catalyst, said contacting taking place within a solvent, said solvent being a benzene in which at least four of the carbons have a substituent selected from the group consisting of chlorine, bromine, fluorine and iodine.

2. The process of claim 1 in which the solvent is selected from the group consisting of 1,2,3,4-tetrachlorobenzene and 1,2,3,5-tetrachlorobenzene, pentachlorobenzene and pentafluorobenzene.

3. The process of claim 1 wherein said hydrocarbon is a C$_4$-C$_7$ paraffin.

4. The process of claim 1 wherein said hydrocarbon is aromatic.

5. The process of claim 1 wherein said catalyst contains a minor amount of a promoter.

6. The process of claim 1 wherein said hydrocarbon is a xylene.

7. The process of claim 1 wherein a naphthene is added to the catalyst.

8. The process of claim 7 wherein said naphthene is methylcyclopentane.

9. The process of claim 1 wherein said catalyst is aluminum bromide.

10. The process of claim 1 further including the step of adding hydrogen under mild conditions to the liquid phase.

11. The process of claim 10 wherein said contacting is carried out in the presence of a hydrogenation component.

12. The process of claim 11 wherein said hydrogenation component is platinum deposited on carbon.

13. The process of claim 12 wherein the carbon contains 0.1 to 10 percent weight of platinum.

14. A process for isomerizing $C_4$ to $C_6$ paraffins which comprises contacting said paraffins in the liquid phase with an aluminum bromide catalyst, said contacting taking place within a solvent comprising 1,2,3,4-tetrachlorobenzene and recovering an isomerized paraffin.

15. The process of claim 14 wherein said contacting takes place at a temperature of 25° to 150°C.

16. The process of claim 14 wherein said contacting takes place in the presence of hydrogen.

17. The process of claim 16 wherein said contacting takes place in the presence of a hydrogenation catalyst.

18. The process of claim 17 wherein the hydrogenation component is either a Group VIII metal or an alloy of Pt with one or more Group VIII metals supported on carbon.

19. The process of claim 18 wherein the support may be one selected from the group consisting of silica, glass beads, glass chips, glass fibers and inert polymers.

* * * * *